United States Patent [19]

Matsui et al.

[11] Patent Number: 4,772,770

[45] Date of Patent: Sep. 20, 1988

[54] APPARATUS FOR JOINING CERAMICS BY MICROWAVE

[75] Inventors: Masao Matsui; Hideoki Fukushima; Teruo Yamanaka; Hirozumi Azuma; Michiru Esaki, all of Aichi, Japan

[73] Assignee: Kabushiki Kaisha Toyota Chuo Kenkyusho, Yokomichi, Japan

[21] Appl. No.: 64,541

[22] Filed: Jun. 22, 1987

[30] Foreign Application Priority Data

Jun. 30, 1986 [JP] Japan ................ 61-153793

[51] Int. Cl.$^4$ ............................................. H05B 6/68
[52] U.S. Cl. .................... 219/10.55 A; 219/10.55 B; 219/10.55 M; 264/26; 425/174.8 E
[58] Field of Search ............... 219/10.55 M, 10.55 B, 219/10.55 R, 10.55 A, 10.55 F; 264/25, 26, 27; 425/174.8 E, 174.8 R, 174.4; 156/379.6

[56] References Cited

U.S. PATENT DOCUMENTS

| | | | |
|---|---|---|---|
| 3,704,523 | 12/1972 | Guerga et al. | 219/10.55 A |
| 3,765,985 | 10/1973 | Siard et al. | 219/10.55 A |
| 4,100,386 | 7/1978 | Bardet | 219/10.55 M |
| 4,147,911 | 4/1979 | Nishitani | 219/10.55 R |
| 4,456,806 | 6/1984 | Arimatsu | 219/10.55 B |
| 4,529,857 | 7/1985 | Meek et al. | 219/10.55 M |

Primary Examiner—Philip H. Leung
Attorney, Agent, or Firm—Oblon, Fisher, Spivak, McClelland & Maier

[57] ABSTRACT

An apparatus for joining two ceramics using microwave energy, having a cavity resonator in which the ceramics are placed; a microwave-generator means for producing microwave radiation to be introduced into the cavity resonator; a pressurizer for pressing the joining surfaces of the ceramics against each other; and a temperature controller for controlling the temperature distribution of the ceramics in such a way that the temperature of the ceramics at the joining surfaces is highest and rapidly decreases toward the unjoined ends of the ceramics is disclosed. The microwave-generator may include a microwave oscillator, a klystron amplifier, and an isolator. The temperature controller can be a dielectric heater or a combination of a dielectric heater and a temperature difference-producer.

7 Claims, 11 Drawing Sheets

CENTER OF JOINING BOUNDARY

JOINING BOUNDARY

JOINING BOUNDARY

APPARATUS FOR JOINING CERAMICS BY MICROWAVE

FIELD OF THE INVENTION

The present invention relates to an apparatus which joins two ceramics together using microwave radiation.

BACKGROUND OF THE INVENTION

Specialty ceramics are used as structural materials under high-temperature environment and excellent in resistance to heat and resistance to corrosion. These ceramics are being developed in wide applications including aeronautical, automotive, and electronic materials. However, ceramics are very difficult to machine. This is one impediment to practical usage of ceramics. One solution to this is to develop techniques for fabricating a complexly shaped article from small molded parts by joining. This is necessary to use ceramics as high-temperature materials in practice.

There have existed methods for joining ceramics together, using adhesive or solder. These methods need complex manufacturing steps. Further, the adhesive strength is not sufficient at high temperatures. Also, there exist methods for joining ceramics together by pressing them against each other using hot isostatic pressing or hot pressing through solid-phase diffusion. When these methods are employed, high adhesive strength is obtained at high temperatures, but a complex and large apparatus is needed. Further, the efficiency and the productivity are low, because the materials are totally heated.

One method of locally heating joining surfaces for joining ceramics together uses a laser or electron beam. When a laser beam is used, ceramics are externally heated and melted to join them together. Therefore, the internal strength is low, and the shape of the joining surfaces tends to deform. Further, only the oxide ceramics can be joined. Furthermore, it is difficult to accurately control the temperature. This creates a large temperature difference, causing cracks in the joining surfaces. In order to prevent the occurrence of the cracks, it is necessary to preheat the ceramics by other methods. Even if the occurrence of the cracks can be prevented, air bubbles remain in the joints, and crystal grains grow. In this way, a high reliability is not provided.

When metal workpieces are joined together, an electron beam is often used. However, it is difficult to join ceramics together with an electron beam, because ceramics are insulators. Even if ceramics can be joined together, cracks are produced by heat, and air bubbles remain in the same way as in the case using a laser beam. Hence, this method is not reliable, either.

SUMMARY OF THE INVENTION

In view of the foregoing problems with the prior art techniques, it is an object of the present invention to provide an apparatus which can join ceramics together at a high joining strength without adversely affecting them, e.g., without producing cracks due to heat.

The above object is achieved in accordance with the teachings of the invention by an apparatus comprising: a cavity resonator in which ceramics to be joined together are placed; a microwave-generating means for producing microwave radiation to be introduced into said cavity resonator; a pressurizing means for applying a pressure to the ceramics so as to press joining surfaces thereof against each other; and a temperature control means for controlling a temperature distribution of the ceramics so as to make a temperature of the ceramics highest at the joining surfaces of the ceramics and decreased toward unjoined ends of the ceramics.

In accordance with the invention, ceramics are heated by dielectric heating using microwaves and so each ceramic is uniformly heated from the inside thereof. Therefore, the joining surfaces are uniformly heated. Hence, the joining surfaces can be totally and more uniformly joined together than the case where the outer peripheries of ceramics are joined together, using an external heat source such as a laser beam or electron beam.

Ceramics exhibit quite small dielectric loss factors, given by $\epsilon_r \tan \delta$, at room temperature, but the factors rapidly increase as temperature is elevated. This is called a runaway phenomenon. Generally, it is considered that ceramics have small dielectric loss factors and are difficult to heat by dielectric heating. However, the present inventors have found that even ceramics whose dielectric loss factors are small at room temperature rapidly increase in their dielectric loss factors at high temperatures, as shown in FIG. 2, where the dielectric loss factor of a heated ceramic is plotted against temperature.

When a sample is heated by dielectric heating utilizing microwave radiation, the loss energy P stored in the sample is given by $$P = \tfrac{1}{2} \epsilon_0 \epsilon_r \tan\delta \omega E^2 \text{ (in W/m}^3\text{)} \tag{1}$$

where $\epsilon_0$ is the dielectric constant of vacuum, $\epsilon_r \tan \delta$ is the dielectric loss factor of the sample, $\epsilon_r$ is the dielectric constant, $\tan \delta$ is the dielectric loss tangent, $\omega$ is the angular frequency, and E is the electric field strength. As the value of $\epsilon_r \tan \delta$ is increased, the sample is heated at a higher rate by dielectric heating. Accordingly, when a ceramic is heated by microwave radiation, the value of $\epsilon_r \tan \delta$ is very small at room temperature, but it increases rapidly with temperature because of the runaway phenomenon. Therefore, the ceramic is heated at a higher rate, which in turn increases the temperature more rapidly. Generally, ceramics have thermal conductivities smaller than those of metals as given by $$\lambda < 0.1 \text{ cal/cm·sec·}^\circ\text{C.}$$

The present invention utilizes both the aforementioned runaway phenomenon and the fact that ceramics have small thermal conductivities, in order to create such a temperature distribution that the temperature of the joining surfaces of ceramics is highest and that the temperature rapidly drops from the joining surfaces toward the unjoined ends of the ceramics. The ceramics are effectively and firmly joined together by this temperature distribution.

As shown in FIG. 3, before ceramics are heated, the temperature measured along the whole length of the ceramics is uniform as indicated by curve a. Then, the ceramics are so heated that the temperature of the joining surfaces is highest and that temperature drops toward the unjoined ends as indicated by curve b. After the temperature of the joining surfaces exceeds a certain critical temperature, it rises rapidly due to runaway phenomenon. Since the ceramics have a small thermal conductivity, temperature decreases rapidly from the joining surfaces toward the unjoined ends, as indicated by curve c. In this way, only the joining surfaces are heated rapidly and so it is possible to effectively heat the ceramics. The graph of FIG. 3 shows the temperature distribution of the ceramics, taken about the joining surfaces in the longitudinal direction of the ceramics.

When the novel apparatus is used, only the joining surfaces are heated. Therefore, the structure of the ceramics does not deteriorate due to heat. Since microwave power is concentrated on the joining surfaces, ceramics can be joined together efficiently and firmly. Especially, a sintering aid having a large dielectric loss factor is preferentially heated by dielectric heating and, therefore, the temperature of the joining surfaces can be made low. Hence, the joining surfaces can be joined together well without deteriorating the structure of the joining surfaces. In this way, the joining surfaces can be joined together at a lower temperature than conventional. Further, since rapid heating and accurate control over temperature can be done, it is unlikely that air bubbles are produced in the joining surfaces or that crystal grains grow. Since the ceramics are uniformly heated from inside of the joining surfaces, cracks are not readily produced by heat. The joining surfaces can be uniformly and firmly joined together without deforming the ceramics. In addition, neither preheating nor aftertreatment is necessitated.

Other objects and features of the invention will appear in the course of the description thereof which follows.

DETAILED DESCRIPTION OF THE INVENTION

Figure 1:
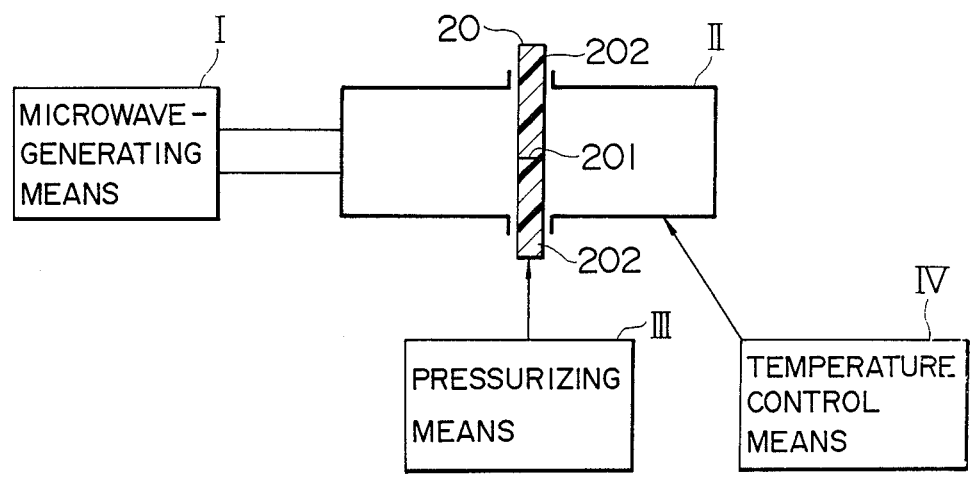
FIG. 1 is a block diagram of an apparatus according to the invention.
Figure 2:
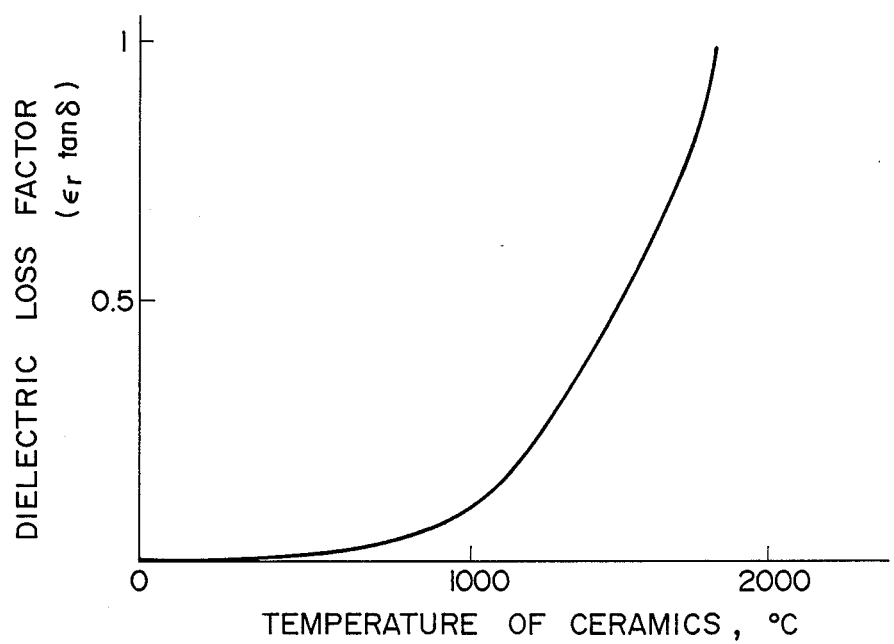
FIG. 2 is a graph in which the dielectric loss factor of a ceramic is plotted against the temperature of the ceramic.
Figure 3:
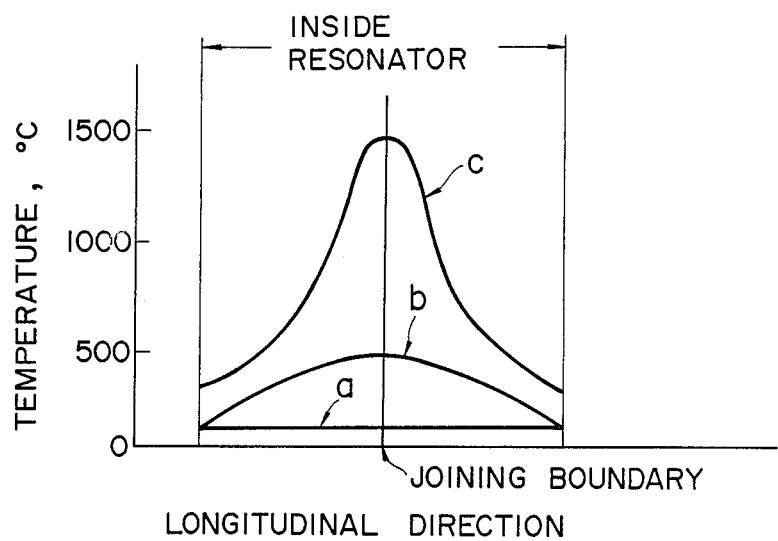
FIG. 3 is a graph showing the temperature distribution of ceramics.

The essential structure of an apparatus according to the invention is first described by referring to FIG. 1. The apparatus comprises a microwave-generating means I, a cavity resonator II, a pressurizing means III, and a temperature control means IV.

In the operation of the apparatus shown in FIG. 1, the microwave-generating means I produces microwave radiation, which is caused to enter the cavity resonator II. Thus, ceramics 20 placed inside the resonator II are heated by dielectric heating. At this time, the pressurizing means III applies a pressure to one or both of the unjoined ends 202 of the ceramics 20. The temperature control means IV controls the temperature distribution of the ceramics 20 in such a way that the temperature of the joining surfaces 201 of the ceramics 20 is highest and that temperature drops from the joining surfaces 201 toward the unjoined ends 202. In this way, only the joining surfaces 201 of the ceramics 20 are effectively heated and joined together.

Figure 4:
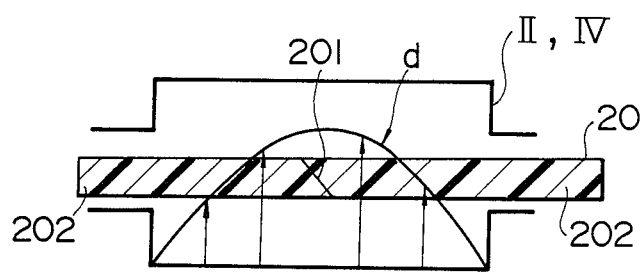
FIG. 4 is a schematic diagram of a first mode of the invention including a cavity resonator and a temperature control means.

Referring next to FIG. 4, there is shown a first mode of the apparatus shown in FIG. 1. The temperature control means IV comprises a dielectric heating means for producing an electric field perpendicular to the axis of the ceramics 20. The intensity of the field is strongest on the joining surfaces 201. The microwave radiation propagates from the front side of the sheet of the figure toward the rear side and enters the cavity resonator II. Curve d represents the electric field distribution due to the microwave radiation. The arrows indicate the direction and the intensity of the electric field. The same applies to FIGS. 6, 17, 18, 19, and 20.

Figure 5:
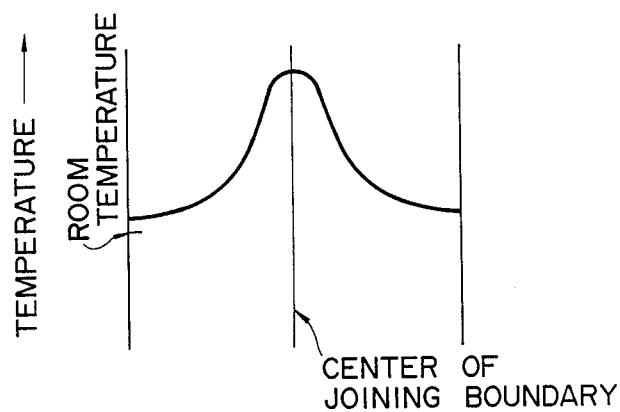
FIG. 5 is a graph showing the temperature distribution of ceramics placed in the cavity resonator shown in FIG. 4.

In this mode, the ceramics can take a rodlike shape, a cylindrical form, or other axially extending form. The electric field is so set up that the electric field intensity on the joining surfaces 201 of the ceramics 20 is greatest, thereby preferentially heating the joining surfaces 201 by dielectric heating. Since the ceramics 20 have a small thermal conductivity, the temperature distribution takes the form shown in FIG. 5. That is, the temperature on the joining surfaces 201 is highest, and temperature rapidly drops toward the unjoined ends 202. Thus, the ceramics 20 are locally heated, i.e., only the joining surfaces 201 are heated. The graph of FIG. 5 shows the temperature distribution of the ceramics 20 shown in FIG. 4, taken axially of the ceramics. In order to enhance the reliability of the joining operation and to increase the joining strength, the joining surfaces are ground to make them flat. Then, they are caused to abut against each other without producing any gap between them.

Figure 6:
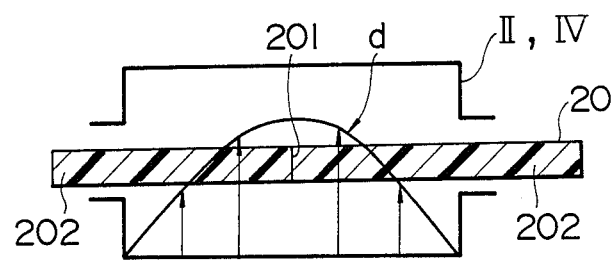
FIG. 6 is a schematic diagram of a second mode of the invention including a cavity resonator and a temperature control means.

Referring next to FIG. 6, there is shown a second mode of the apparatus shown in FIG. 1. The temperature control means IV consists of a dielectric heating means for producing an electric field parallel to the joining surfaces 201 of the ceramics 20. The intensity of the electric field on the joining surfaces 201 is greatest. Shown in FIG. 6 are the cavity resonator II and the temperature control means IV. This apparatus can join together ceramics of various shapes, including rodlike form, cylindrical form, other axially extending form, and spherical form.

Figure 7:
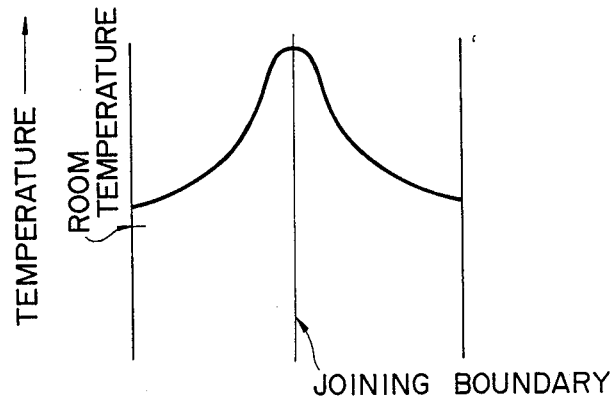
FIG. 7 is a graph showing the temperature distribution of ceramics placed in the cavity resonator shown in FIG. 6.

In the mode, the electric field is generated in such a way that the field intensity on the joining surfaces 201 of the ceramics 20 is greatest. The joining surfaces 201 is preferentially heated by dielectric heating in the same manner as in the aforementioned first mode. Since the ceramics 20 have a small thermal conductivity, the temperature distribution assumes the form shown in FIG. 7. That is, the temperature on the joining surfaces 201 is highest, and temperature rapidly drops toward the unjoined ends 202. In this way, the ceramics are locally heated, i.e., only the joining surfaces 201 are heated. The graph of FIG. 7 shows the temperature distribution of the ceramics 20, taken perpendicularly to the joining surfaces 201. In the same way as in the first mode, the joining surfaces of the ceramics are rendered flat so that no gap may be produced between them when they are caused to abut against each other.

In the first and second modes, the electric field intensity on the joining surfaces of the ceramics is greatest. In the first mode, the electric field is produced around the axis of the ceramics. In the second mode, the electric field is produced around the joining surfaces of the ceramics.

In a third mode of the apparatus shown in FIG. 1, the temperature control means IV consists of a dielectric heating means and a temperature difference-producing means. The heating means applies microwave radiation to ceramics to heat them by dielectric heating. The temperature difference-producing means makes the temperature of the joining surfaces of the ceramics higher than the temperature of the unjoined ends of the ceramics. As a result, the heating energy is concentrated on the joining surfaces. Since the ceramics have a small thermal conductivity, the temperature distribution is so shaped that temperature rapidly drops toward the unjoined ends of the ceramics.

Figure 18:
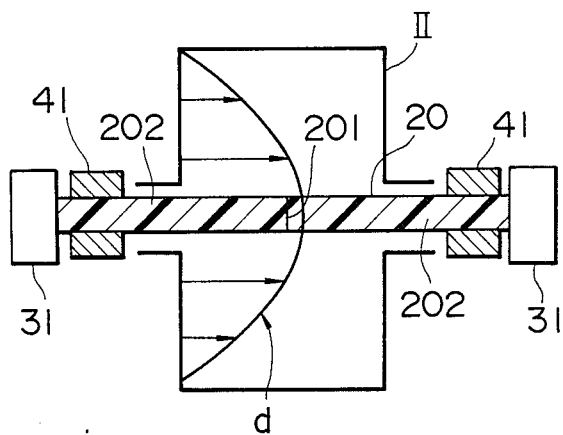
FIG. 18 is a cross-sectional view of the cavity resonator of a second embodiment of the apparatus shown in FIG. 1.

In the aforementioned first and second modes, the ceramics in the cavity resonator is heated by dielectric heating. The above-described temperature distribution is created only by the electric field distribution due to the dielectric heating. When the application of microwave radiation is unable to form the aforementioned temperature distribution but heats the ceramics in a simple manner, or when the requisite temperature distribution cannot be sufficiently formed, the third mode is utilized to form the temperature distribution. Referring to FIG. 18, an electric field parallel to the axis of ceramics is produced. Temperature is almost uniform axially of the ceramics. In this case, the aforementioned temperature distribution is not created. Consequently, the necessary temperature difference is made by the temperature difference-producing means in this mode. The temperature difference-producing means assumes various forms as described below.

Figure 8:
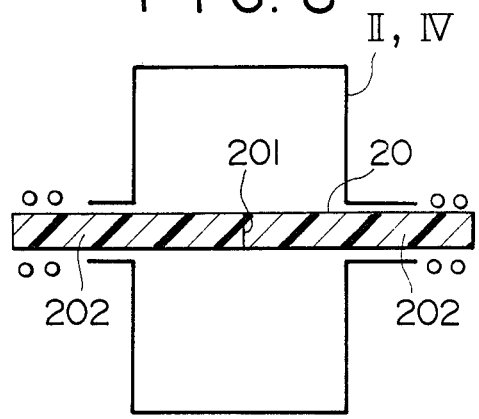
FIG. 8 is a schematic diagram of a fourth mode of the invention including a cavity resonator and a temperature control means.
Figure 9:
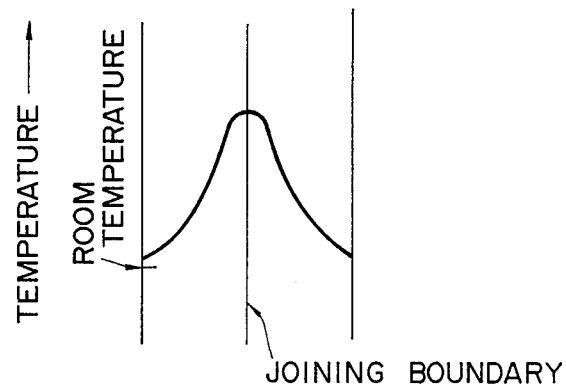
FIG. 9 is a graph showing the temperature distribution of ceramics placed in the cavity resonator shown in FIG. 8.

A fourth mode of the apparatus shown in FIG. 1 is shown in FIG. 8, where the aforementioned temperature difference-producing means consists of a means for cooling the unjoined ends 202 of the ceramics 20. Shown in FIG. 8 are the cavity resonator II and the temperature control means IV. Since the unjoined ends 202 of the ceramics 20 are cooled, the temperature of the joining surfaces 201 of the ceramics 20 is higher than the ambient temperature. Therefore, the dielectric loss factor of the joining surfaces 201 is higher than that of the surroundings. Thus, the heating energy is concentrated on the joining surfaces 201. As a result, the temperature distribution shown in FIG. 9 is created. That is, the temperature of the joining surfaces 201 is highest, and temperature rapidly drops toward the unjoined ends 202. In this way, the ceramics are locally heated, i.e., only the joining surfaces 201 are heated. The graph of FIG. 9 shows the temperature distribution of the ceramics around the joining surfaces 201 of the ceramics 20, the distribution being taken longitudinally of the ceramics 20. It is desired to flatten the joining surfaces so that no gap is created between them when they are caused to abut against each other, in the same manner as in the first mode.

The means for cooling the unjoined ends of the ceramics can use air, water, or any other medium. As an example, when the unjoined ends are water-cooled, tubes of a metal having a large thermal conductivity are mounted outside the cavity resonator and wound on the unjoined ends or chucks of the ceramics. When the unjoined ends are air-cooled, air nozzles or other similar means are employed. The front ends of the nozzles are brought close to the end surfaces of the ceramics to cool these surfaces. Where the thermal conductivity of the ceramics are very small, i.e., $\lambda < 0.01$ cal/cm·sec·° C., the unjoined ends of the ceramics may be placed outside the cavity resonator to air-cool them.

Figure 10:
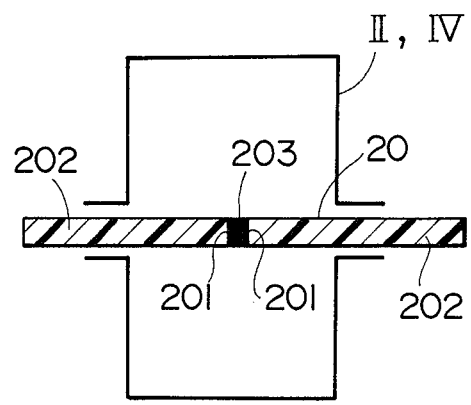
FIG. 10 is a schematic diagram of a fifth mode of the invention including a cavity resonator and a temperature control means.
Figure 11:
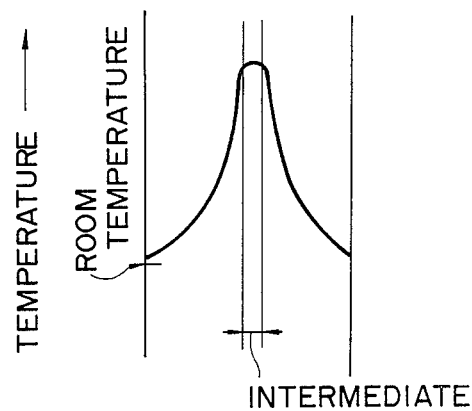
FIG. 11 is a graph showing the temperature distribution of ceramics placed in the cavity resonator shown in FIG. 10.

A fifth mode of the apparatus shown in FIG. 1 is shown in FIG. 10, where the temperature difference-producing means consists of an intermediate or interposition 203 placed between joining surfaces 201 of the ceramics 20, the interposition 203 being made of a material having a dielectric loss factor larger than that of the ceramics 20. Also shown in FIG. 10 are the cavity resonator II and the temperature control means IV. In this mode, the interposition 203 between the joining surfaces 201 has a larger dielectric loss factor than that of the joined ceramics 20 and so the interposition 203 is preferentially heated by dielectric heating. For this reason, the temperature of the interposition 203 rises faster than the ambient temperature. As a result, the interposition 203 is heated rapidly as shown in FIG. 11. Therefore, the temperature of the joining surfaces between which the interposition is held is highest, and temperature rapidly drops toward the unjoined ends 202. In this manner, the ceramics are locally heated, i.e., only the joining surfaces 201 are heated. The graph of FIG. 11 shows the temperature distribution of the ceramics 20 around the joining surfaces 201, taken longitudinally of the ceramics.

In this fifth mode, the heating energy is concentrated on the interposition 203. Therefore, the ceramics 20 can be joined together irrespective of the thermal conductivity of the ceramics. Also, no limitations are imposed on the shape of the joining surfaces, because the ceramics are not directly joined together. Further, the force applied to them can be made smaller than the force required in the first mode. The interposition 203 can be made of any desired material, as long as its dielectric loss factor is larger than that of the ceramics 20. However, considering the resistance to heat, it is desired to fabricate the interposition from a ceramic. In this case, the main constituent of the interposition can be either similar or dissimilar to the material of the ceramics 20. However, in order to achieve more rigid joint, the interposition 203 is made of the same material as the main constituent of the ceramics 20. The dielectric loss factor of the material of the interposition is larger by more than 0.005 than that of the ceramics 20. The material exhibits a good wettability when it is in contact with the ceramics 20. Preferably, the material is a heat-resistant ceramic. The material of the interposition 203 can also be made of a powdered material. In this case, the powder is compacted into a plate and interposed between the joining surfaces. Where the material is a ceramic, it can be sintered and shaped into a plate.

Figure 12:
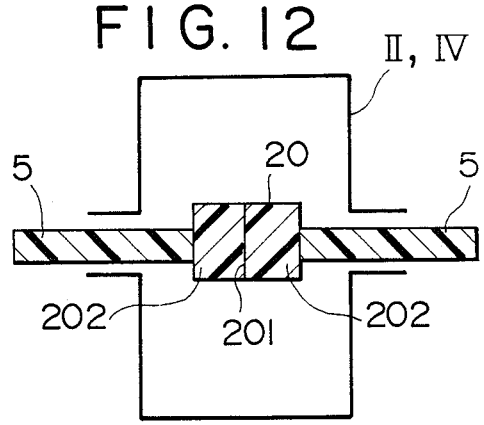
FIG. 12 is a schematic diagram of a sixth mode of the invention including a cavity resonator and a temperature control means.
Figure 13:
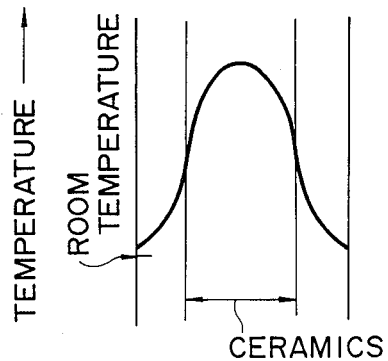
FIG. 13 is a graph showing the temperature distribution of ceramics placed in the cavity resonator shown in FIG. 12.

Referring next to FIG. 12, there is shown a sixth mode of the apparatus shown in FIG. 1. The temperature difference-producing means consists of holding members 5 that hold the ceramics 20 within the cavity resonator II. The holding members 5 are made of a material having a dielectric loss factor smaller than that of the ceramics 20 joined together. Also shown in FIG. 12 are the cavity resonator II and the temperature control means IV. The holding members 5 are less easily heated by dielectric heating than the ceramics 20 joined together. Therefore, the temperature of the unjoined ends 202 of the ceramics 20 which are in contact with the holding members 5 drops more rapidly than the joining surfaces 201. The temperature distribution takes the form shown in FIG. 13. That is, the temperature of the joining surfaces 201 of the ceramics 20 is highest. Temperature rapidly drops toward the unjoined ends 202 of the holding members. In this way, only the joining surfaces 201 of the ceramics are heated. The graph of FIG. 13 shows the temperature distribution of the ceramics 20 shown in FIG. 12, the distribution being taken around the joining surfaces 201 longitudinally of the ceramics 20. In this mode, it is necessary to place the boundary between the holding members 5 and the ceramics 20 inside the cavity resonator II, where they are heated by dielectric heating. The holding members 5 may be made of any desired material, as long as it has a smaller dielectric loss factor than that of the ceramics 20. However, the holding members are preferably made of a ceramic to obtain high resistance to heat. In this case, the main constituent of this material can be similar or dissimilar to the material of the ceramics 20. Preferably, the dielectric loss factor of the material is smaller by 0.005 than that of the ceramics 20, and the material is highly resistant to heat.

In the third through sixth modes, the necessary temperature distribution cannot be obtained if only the dielectric heating using the application of microwave radiation is employed. Any of the third through sixth modes can be effected in combination with the first or second mode. Specifically, the electric field is produced either perpendicularly to the axis of the ceramics or parallel to the joining surfaces by the dielectric heating means. The electric field is so produced that the field strength on the joining surfaces is greatest and that the required temperature distribution is formed. The temperature difference-producing means makes the temperature gradient on the joining surfaces steeper to obtain ideal characteristics. In this way, the ceramics can be effectively joined together.

Where the thermal conductivity of the ceramics is large, the fourth mode can be carried out in combination with the first or second mode to further concentrate the heating energy on the joining surfaces, for joining them together. More specifically, the electric field intensity on the joining surfaces is caused to assume a maximum value. The unjoined ends of the ceramics are cooled. In this way, the desired temperature distribution is obtained, although the joined ones are ceramics of a large thermal conductivity. That is, the temperature of the joining surfaces is highest, and temperature rapidly drops toward the unjoined ends of the ceramics. Only the joining surfaces are heated. Consequently, a rigid joint can be accomplished.

In the first, second, fourth, and sixth modes, the ceramics are directly joined together. In these cases, the sintering aid contained in the ceramics has a larger dielectric loss factor than that of the main constituent of the ceramics. In the fifth mode, an interposition is placed between ceramics. In this case, the interposition has a larger dielectric loss factor than that of the ceramics joined together. Hence, in these modes, the heating energy is concentrated on the sintering aid or the interposition during the joining operation. For this reason, it is possible to make the temperature of the joining surfaces low. Consequently, the ceramics can be bonded together without deteriorating the structure of the joints.

Figure 14:
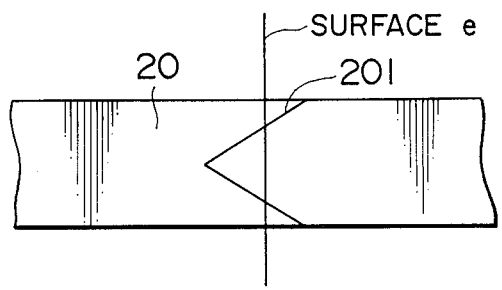
FIGS. 14 and 15 are side elevations of two ceramics joined together.
Figure 15:
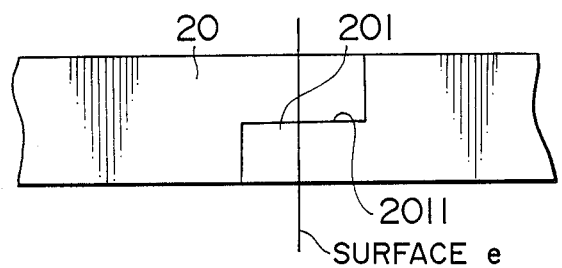

In the first and second modes, the electric field intensity on the joining surfaces is greatest. As shown in FIG. 14, the joining surfaces 201 of ceramics 20 take a V-shaped form. In this special case, the electric field is so produced that the field is vertical to the axis of the ceramics and that the field intensity on the central plane e passing across the joining surfaces is greatest. In this way, the ceramics can be effectively joined together. As shown in FIG. 15, the joining surfaces 201 of ceramics 20 have steps. In this case, the electric field intensity on an intermediate joining surface 2011 is made greatest. Alternatively, the electric field intensity on the surface e is made greatest in the same manner as in FIG. 14.

Figure 17:
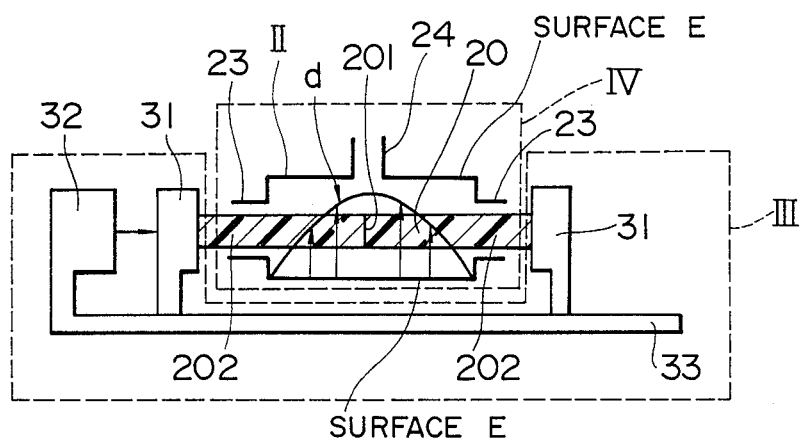
FIG. 17 is a cross-sectional view taken on line XVII—XVII of FIG. 16.
Figure 16:
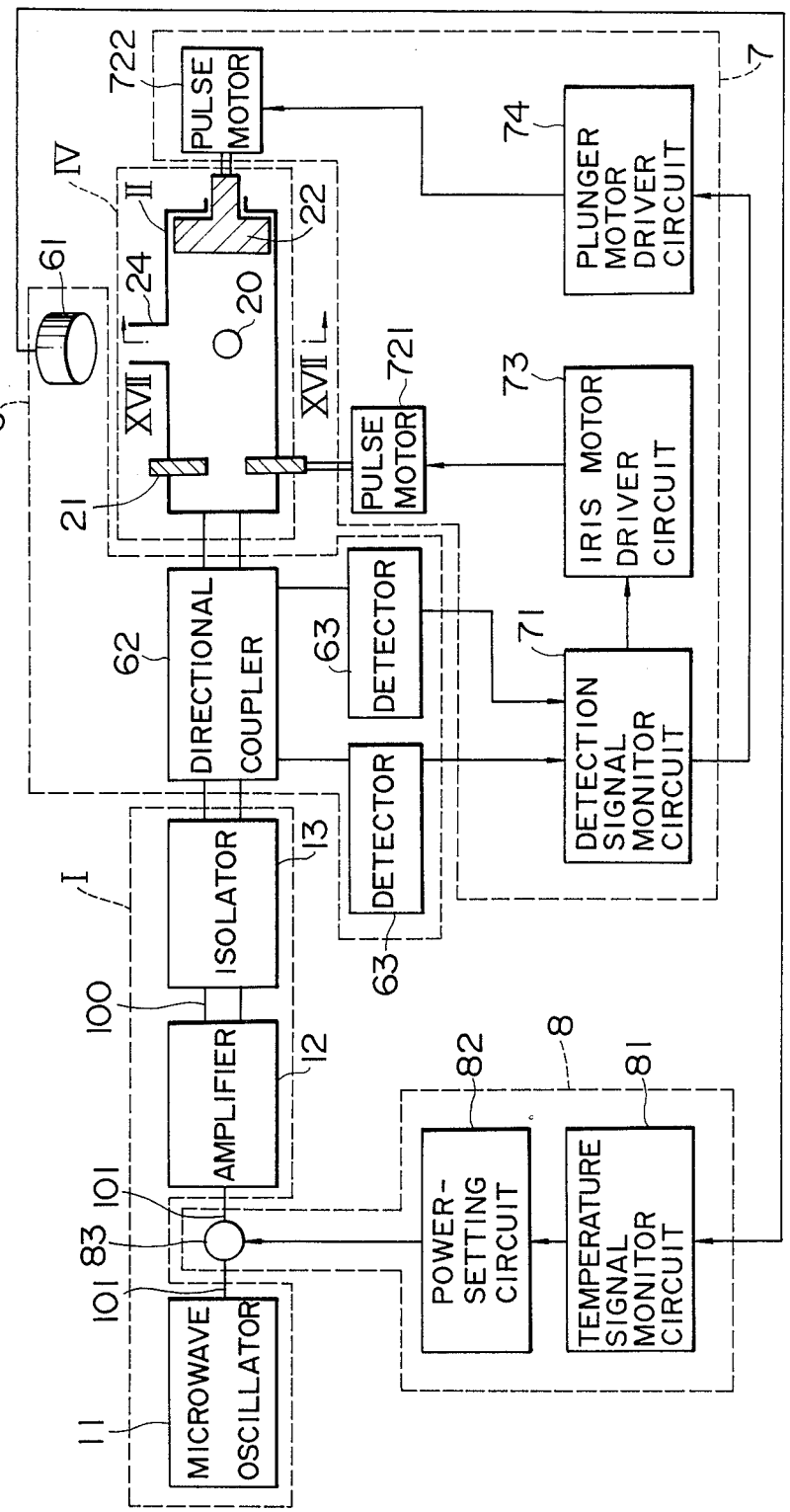
FIG. 16 is a block diagram of a first embodiment of the apparatus shown in FIG. 1.

Referring to FIGS. 16 and 17, there is shown a first embodiment of the apparatus shown in FIG. 1. This embodiment is characterized in that the temperature control means comprises a dielectric heating means for producing an electric field parallel to the joining surfaces of ceramics, the joining surfaces being perpendicular to the axis of the ceramics. The electric field intensity on the joining surfaces is greatest.

The apparatus shown in FIGS. 16 and 17 comprises a microwave-generating means I for producing microwave radiation, a cavity resonator II for heating and joining together ceramics, a pressurizing means III for applying a pressure to the ceramics, a temperature control means IV, a detector means 6 for detecting the temperature of the ceramics and the resonance of the resonator II, a resonance-adjusting means 7 for adjusting the resonance of the resonator II, and a temperature adjusting means 8 for controlling the temperature of the ceramics.

The microwave-generating means I comprises a microwave oscillator 11 of the 6 Hz band, a klystron amplifier 1 capable of amplifying the microwave radiation produced from the oscillator 11 up to 3 KW, and an isolator 13 for absorbing the power reflected from the resonator II to protect the klystron 12 from the reflected power. The klystron 12 is connected to the oscillator 11 by a coaxial cable 101. The isolator 13 is connected to the klystron 12 by a waveguide 100.

The cavity resonator II takes the form of a rectangular cavity, and resonates in $TE_{103}$ mode. The cross section of this resonator measures 20 mm by 40 mm. The length of the resonator is approximately 96 mm. The resonator comprises variable iris 21 for introducing microwave radiation and adjusting the degree of coupling, a plunger 22, or variable short-circuit plate, for adjusting the resonant frequency, holes 23 for inserting ceramics, and a window 24 for detecting the temperature. The iris 21 are symmetrical with each other, and have a height of 20 mm. The irises 21 can move away from each other in a symmetrical manner until the gap between them reaches 40 mm. After the inner surface of the cavity resonator III is ground, it is plated with silver to a thickness of about 2 microns to increase the unloaded Q above 10,000. Consequently, the energy is effectively stored in the ceramics. Thus, even the ceramics having a small dielectric loss factor can be easily heated by dielectric heating at room temperature. The outside of the resonator II is water-cooled to prevent the resonator from overheating.

The pressurizing means III comprises chucks 31 for holding the unjoined ends of the ceramics 20, an air cylinder 32 capable of applying a pressure between the chucks 31, and a movable table 33 for moving the chucks 31 while the chucks are subject to the pressure. The chucks 31 are symmetrical with each other and mounted on the same axis. The pressure applied between the chucks 31 can be increased up to 20 MPa.

The temperature control means IV produces an electric field parallel to the joining surfaces 201 of the ceramics 20 which are placed in the cavity resonator II. The pressurizing means applies a pressure between the unjoined ends of the ceramics 20. The strength of the field on the joining surfaces 201 is greatest. As shown in FIG. 17, the resonator II has broad surfaces E to which the joining surfaces 201 are perpendicular.

The detector means 6 comprises a radiation thermometer 61 for measuring the temperature of the ceramics, a directional coupler 62 for detecting the input power to the resonator II and the power reflected from it, and a detector 63 for converting the input power and the reflected power into low-frequency signals.

The resonance-adjusting means 7 comprises a detection signal monitor circuit 71 for detecting the output signal from the detector 63, a pulse motor 721 for varying the area of the opening of the iris 21, an iris motor driver circuit 73 for producing pulses to the pulse motor 721 in response to the output signal from the monitor circuit 71 in order to drive the motor 721, a pulse motor 722 for driving the plunger 22, and a plunger motor driver circuit 74 for producing pulses to the pulse motor 722 in response to the output signal from the monitor circuit 71.

The temperature adjusting means 8 comprises a temperature signal monitor circuit 81 for detecting the signal produced by the radiation thermometer 61, a power-setting circuit 82 for producing a signal that adjusts the microwave power according to the output signal from the monitor circuit 81, and a power controller 83 for adjusting the microwave power according to the output signal from the power-setting circuit 82.

The apparatus constructed as described above and shown in FIGS. 16 and 17 operates in the manner described below. The microwave power produced by the microwave oscillator 11 is controlled by the power controller 83 and fed to the klystron 12 whose gain is maintained constant. The input power to the resonator II and the power reflected from it are partially separated from each other by the directional coupler 62 and converted into corresponding low-frequency signals by the detector 63. The output signals from the detector 63 are fed to the monitor circuit 71 which delivers an output signal of a constant amplitude. The output signal from the monitor circuit 71 is furnished to the driver circuits 73 and 74 which drive the pulse motors 721 and 722, respectively, to move the variable iris 21 and the plunger 22, respectively.

The temperature of the joining surfaces 201 of the ceramics 20 placed inside the resonator II is measured by the radiation thermometer 61 through the window 24. The output signal from the thermometer 61 which indicates the temperature is fed to the monitor circuit 81 that delivers an output signal of a given amplitude. The output signal from the monitor circuit 81 is applied to the power-setting circuit 82, which delivers its output signal to the power controller 83 to control the microwave power.

In order to bring the cavity resonator II into resonance, the plunger 22 and the variable iris 21 are so driven that the reflectivity (=the reflected power divided by the incident power) detected by the directional coupler 62 is reduced to a minimum.

The rate at which the joining surfaces 201 is heated is set before they are heated. The microwave power is calculated, taking into consideration the thermal loss and the dielectric loss factor of the ceramics which varies during the heating, and the reflectivity of the resonator II. The heating rate actually measured with the radiation thermometer 61 is compared with the preset heating rate. The microwave power is accurately controlled according to this difference. In this way, the rate at which the joining surfaces 201 is heated is controlled.

By the use of the apparatus described above, the cavity resonator II that varies during the heating of the ceramics is maintained substantially in resonance, and the degree of coupling is maintained at exactly or nearly unity. Therefore, the ceramics can be heated at any desired rate without being affected by the rapidly varying dielectric loss factor during the heating. Consequently, the ceramics can be joined together at a desired temperature. Since the electric field strength on the joining surfaces 201 of the ceramics 20 is made greatest by the temperature control means IV, the heating energy is concentrated on the joining surfaces 201. As the ceramics 20 have a small thermal conductivity, the temperature distribution is so formed that the temperature of the joining surfaces 201 is highest and that temperature rapidly drops toward the unjoined ends 202 of the ceramics. This permits the ceramics to be locally joined together. This embodiment is embraced in the second mode of the invention.

Alumina samples of a purity of 92% were joined together, using the apparatus shown in FIGS. 16 and 17. The samples measured 3 mm in diameter and 100 mm in length. The dielectric loss factor was 0.01. The thermal conductivity was 0.04 cal/cm·sec·°C. at room temperature. As shown in FIG. 17, the ceramic samples 20 were placed in the cavity resonator II, and a pressure was applied between the unjoined ends. The joining surfaces 201 were vertical to the broad surfaces E. An electric field was produced parallel to the joining surfaces 201. The electric field strength on the joining surfaces 201 was greatest. The resonator resonates in $TE_{103}$ mode. The joining surfaces of the ceramics were flattened so that no gap might be produced between them. They were ground with a tolerance of about 1 micron. Then, a pressure of 1.5 MPa was applied between the unjoined ends of the ceramics. The temperature of the joining surfaces was measured. The heating operation was carried out within the atmosphere, and started with room temperature. The joining surfaces 201 were rapidly heated at a heating velocity of about 40° C./sec until the temperature of the joining surfaces 201 reached approximately 1,550° C. Thereafter, this temperature was retained for three minutes. Then, they were cooled at a rate of about −15° C./sec and joined together.

As a result, when the temperature is below about 500° C., the temperature has a wide distribution about the joining surfaces by the action of the electric field. When the temperature approached about 700° C., the dielectric loss factor of the joining surfaces increased rapidly. After the temperature exceeded about 1,000° C., the joining surfaces were rapidly heated due to runaway phenomenon. Since the thermal conductivity of the alumina samples was low, local joint was conducted. When the temperature reached about 1,550° C., the temperature measured at locations 5 mm distant from the joining surfaces was about 700° C. In this way, only the joining surfaces were heated. No crystal grains grew in the joining surfaces. No air bubbles were produced in them. Also, no cracks were produced due to heat, unlike cases where a laser beam is used. The joined surfaces had the same uniform structure as the base materials. No boundary could be found in the fused surface. In addition, no change in the shape of the samples could be seen.

A four-point bending test was carried out to measure the strength of the joined ceramics. It was found that the strength of the joined ceramics was the same as the strength of the base materials. When the electric field strength on the joining surfaces of the ceramics was not made greatest, the temperature of the base materials was higher than the temperature of the joining surfaces and so the structure of the base materials deteriorated. Hence, the obtained strength of joint was not satisfactorily high. Sometimes, the ceramics could not be joined together. The maximum microwave power used in this embodiment was 60 W, which was less than a fifth of the power consumed when the ceramics were totally heated.

Referring next to FIG. 18, there is shown second embodiment of the apparatus shown in FIG. 1. In this embodiment, the temperature control means comprises a dielectric heating means for applying microwave radiation to ceramics to heat them by dielectric heating and a temperature difference-producing means for cooling the unjoined ends of the ceramics. The apparatus shown in FIG. 18 is similar to the apparatus shown in FIGS. 16 and 17 except that the electric field is produced vertically to the joining surfaces 201 of the ceramics 20, i.e., the broad surfaces E are made parallel to the joining surfaces 201, and that the temperature control means consists of water-cooled copper tubes 41 mounted on the unjoined ends 202 of the ceramics which are remote from the joining surfaces 201. This embodiment is embraced in the fourth mode of the invention. The cross section of each tube 41 measures 5 mm in height and 3 mm in width. The copper tubes 41 are water-cooled to cool the unjoined ends 202 of the ceramics 20. Therefore, the temperature of the joining surfaces 201 of the ceramics 20 becomes higher than the ambient temperature. Thus, the dielectric loss factor of the joining surfaces 201 is made higher than the dielectric loss factors of the surroundings. In this way, the heating energy is concentrated on the joining surfaces 201. Consequently, the ceramics can be locally joined together.

Alumina samples similar to the samples used in the first embodiment were joined together using the apparatus shown in FIG. 18. The conditions including the shape of the joining surfaces, the pressure, the temperature at which they are joined, and the time for which the joining operation is performed were similar to those employed in the first embodiment.

In the same manner as in the embodiment described above, when the temperature was in excess of about 1,000° C., the joining surfaces were rapidly heated because of runaway effect. Since the thermal conductivity of the alumina samples was small, a local joining was effected. The joined surfaces had the same structure as the base materials. The boundary between the joining surfaces was not discernible. A four-point bending test was conducted on the joined alumina samples. The results showed that the strength of the joined samples was the same as the strength of the base materials.

When ceramic samples having a large thermal conductivity, i.e., $\lambda > 0.1$ cal/cm·sec·°C., such as silicon carbide, are joined together, this embodiment is combined with the first embodiment shown in FIGS. 16 and 17 to heat and join together only the joining surfaces. In this embodiment, the end surfaces of the samples are water-cooled. It is also possible to cool the chucks of the samples. Depending on the kind of the samples, the portions of the samples which are located outside the cavity resonator may be air-cooled with or without air nozzles.

Figure 19:
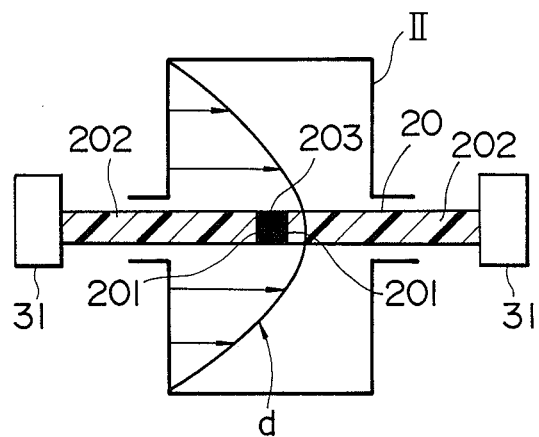
FIG. 19 is a cross-sectional view of the cavity resonator of a third embodiment of the apparatus shown in FIG. 1.

Referring to FIG. 19, there is shown a third embodiment of the apparatus shown in FIG. 1. This embodiment is characterized in that the temperature control means consists of a dielectric heating means for applying microwave radiation to ceramics to be joined together to heat them by dielectric heating and a temperature difference-producing means that is formed by an interposition placed between the joining surfaces of the ceramics. The interposition is made of a material having a dielectric loss factor larger than that of the ceramics. The apparatus shown in FIG. 19 is similar to the apparatus shown in FIGS. 16 and 17 except that the electric field is produced perpendicularly to the joining surfaces 201 of the ceramics 20 inside the cavity resonator II, i.e., the broad surfaces E are made parallel to the joining surfaces 201, and that the temperature control means includes an interposition 203 placed between the joining surfaces 201. The interposition 203 is made of a material having a dielectric loss factor larger than that of the joined ceramics 20. Therefore, the heating energy is concentrated on the interposition 203. The temperature of the joining surfaces 201 is highest, because they are in contact with the interposition 203 heated by dielectric heating. Temperature rapidly drops toward the unjoined ends 202. This embodiment is embraced in the fifth mode of the invention.

Alumina samples of a purity of 99% was joined together, using the apparatus shown in FIG. 19. The samples measured 3 mm in diameter and 100 mm in length. At room temperature, the dielectric loss factor of the samples was 0.001, and the thermal conductivity was 0.06 cal/cm·sec·° C. The interposition 203 was a sheet of alumina having a larger dielectric loss factor than the alumina samples. The thickness of the interposition 203 was 0.5 mm. The dielectric loss factor of the interposition 203 was 0.01 at room temperature. The interposition 203 contained $Al_2O_3$ as its main constituent, 1.5% of CaO, 0.8% of MgO, and 7% of $SiO_2$. The shape of the joining surfaces of the alumina samples was the same as the shape used in the embodiment shown in FIGS. 16 and 17. The alumina samples were placed within the atmosphere, and a pressure of 0.5 MPa was applied between the unjoined ends of the samples. The heating operation started with room temperature, and was carried out at a high rate of about 40° C./sec until the temperature of the joining surfaces 201 reached about 1,550° C. This temperature was then maintained for three minutes. Then, the joining surfaces were gradually cooled at a rate of about $-15°$ C./sec. As a result, they were joined together.

In this way, the heating energy was concentrated on the interposition 203, so that only the joining surfaces 201 of the samples 20 were heated. They were well joined together without deforming the joining surfaces 201. At this time, neither the occurrence of cracks due to heat nor the production of air bubbles could be observed on the joining surfaces 201. A four-point bending test was made on the ceramics joined together. The results showed that the strength of the joined ceramics was in excess of 70% of the strength of the base materials.

In this embodiment, those materials which are not easily joined together directly can be joined together. Since the heating energy is concentrated on the interposition of a larger dielectric loss factor, ceramics having more complex form than the ceramics used in the aforementioned two embodiments can be joined together. In this embodiment, the interposition was a sheet of alumina. It can also be powdered alumina of the same composition.

Figure 20:
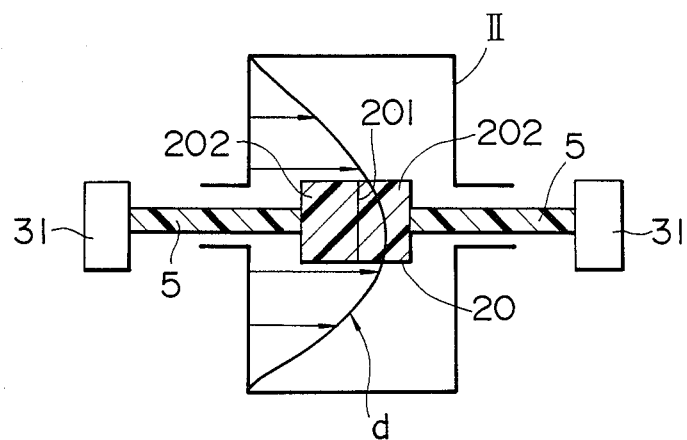
FIG. 20 is a cross-sectional view of the cavity resonator of a fourth embodiment of the apparatus shown in FIG. 1.

Referring next to FIG. 20, there is shown a fourth embodiment of the apparatus shown in FIG. 1. This embodiment is characterized in that the temperature control means comprises a dielectric heating means and a temperature difference-producing means including holding members for holding ceramics to be joined together in the cavity resonator. The dielectric heating means applies microwave radiation to the ceramics to heat them by dielectric heating. The holding members are made of a material having a smaller dielectric loss factor than that of the ceramics. The apparatus shown in FIG. 20 is similar to the apparatus shown in FIGS. 16 and 17 except that the electric field is produced perpendicularly to the joining surfaces 201 of the ceramics 20, i.e., the broad surfaces E are made parallel to the joining surfaces 201, and that the temperature control means comprises holding members 5 made of a ceramic having a smaller dielectric loss factor than that of the ceramics 20. The holding members 5 hold the unjoined ends of the ceramics 20, and are located so that those portions of the holding members 5 which are in contact with the ceramics 20 are placed inside the resonator.

The holding members 5 are difficult to heat by microwave dielectric heating, because their dielectric loss factor is smaller than the dielectric loss factor of the ceramics 20. Inversely, the joining surfaces 201 of the ceramics 20 which are remote from the holding members 5 are easily heated by dielectric heating. Therefore, the temperature of the joining surfaces 201 becomes highest. Temperature rapidly decreases toward the unjoined ends 202 which are in contact with the holding members 5. This embodiment is embraced in the sixth mode of the invention.

Alumina samples similar to those used in the embodiment already described in connection with FIGS. 16 and 17 were joined together, using the apparatus shown in FIG. 20. The diameter of the holding members was 3 mm. Each of the holding members consisted of a rod of sapphire. The dielectric loss factor of this rod was less than 0.0001 at room temperature. The rods were fastened using chucks. The rods were first temporarily attached to the alumina samples with rubber adhesive. The conditions including the shape of the joining surfaces of the samples, the pressure applied, the temperature at which they are joined together, and the time for which the joining operation is performed were similar to those employed in the embodiment described in connection with FIGS. 16 and 17.

As a result, only the joining surfaces were rapidly heated and well joined together without deforming the surfaces. Hence, the joined surfaces had the same structure as the base materials. During the heating, the rubber adhesive for the temporal attachment evaporated. After the samples were joined together, the completed sample and the rods could be easily removed. The shear strength of the joined ceramics was measured. It was found that the strength was the same as the strength of the base materials.

In this embodiment, even small ceramic samples can be joined together. When the ceramics are small in size and have a small dielectric loss factor, an interposition having a large dielectric loss factor is mounted between the joining surfaces. In this way, a joining operation can be carried out in the same manner as in the embodiment already described in connection with FIG. 19.

Figure 21:
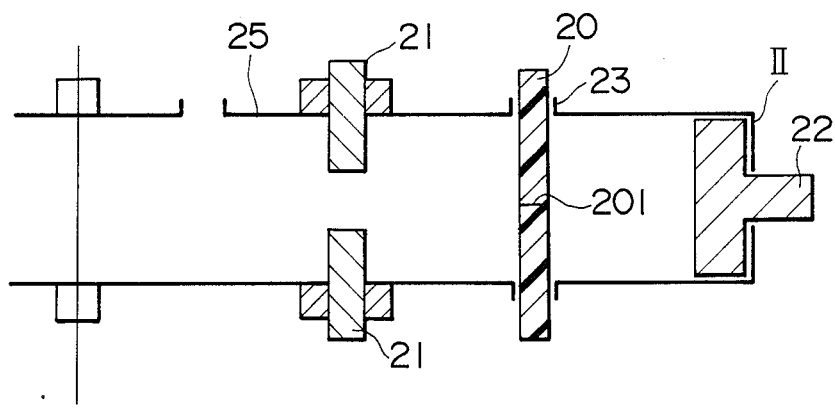
FIG. 21 is a cross-sectional view of the cavity resonator of a fifth embodiment of the apparatus shown in FIG. 1.

Referring next to FIG. 21, there is shown a fifth embodiment of the apparatus shown in FIG. 1. This embodiment is characterized in that members of silicon nitride are joined together within an atmosphere of nitrogen gas. The apparatus shown in FIG. 21 is similar to the apparatus shown in FIG. 16 except that an airtight waveguide 25 is mounted in front of the cavity resonator II. Nitrogen gas is admitted into the resonator through the waveguide 25 and discharged from the resonator through the sample inlet ports 23. Specifically, a pressure is applied between the unjoined ends of the ceramic samples 20 placed inside the resonator II. The electric field is produced parallel to the joining surfaces 201 of the samples 20, i.e., the broad surfaces E are made vertical to the joining surfaces 201. The intensity of the electric field on the joining surfaces 201 is greatest. The inside of the resonator II is filled with nitrogen gas. Airtight gasket is inserted in the connecting portions of the resonator II to prevent air from flowing into it. This embodiment is embraced in the second mode of the invention.

Each of the ceramic samples was made of silicon nitride and measured 3 mm in diameter and 100 mm in length. The dielectric loss factor of this silicon nitride was 0.005, and the thermal conductivity was 0.4 cal/cm·sec·° C. at room temperature. The shape of the joining surfaces was the same as in the embodiment described in connection with FIGS. 16 and 17. A pressure of 6 MPa was applied between the unjoined ends of the samples. The samples were placed within an atmosphere of nitrogen gas. The heating operation started with room temperature, and was carried out at a high rate of about 40° C./sec until the temperature of the joining surfaces 201 reached about 1,500° C. This temperature was maintained for 10 minutes. Then, the joining surfaces were slowly cooled at a rate of about −15° C./sec to join them together. As a result, only the joining surfaces could be heated in the same manner as in the embodiment described in connection with FIGS. 16 and 17 without deforming the joining surfaces. The joined surfaces had the same structure as the base materials. In this way, the joining operation was effected well. A four-point bending test was made on the joined ceramics. It was found that the strength of the joined ceramics exceeded 60% of the strength of the base materials.

Members having different shapes as shown in FIGS. 22–26 and made of sintered alumina like the embodiment shown in FIGS. 16 and 17 were joined together, using the apparatus shown in FIGS. 16 and 17. The purity of the sintered alumina was 92%. The conditions including the pressure applied, the temperature at which the members were joined together, and the time for which the joining operation was carried out were the same as those used in the embodiment already described in conjunction with FIGS. 16 and 17.

Figure 22:
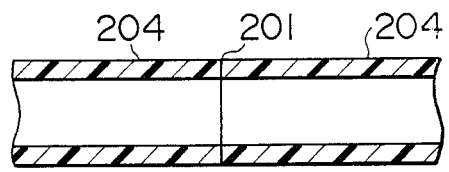
FIGS. 22-24 are cross-sectional views of ceramics joined together by a sixth embodiment of the apparatus shown in FIG. 1.

As shown in FIG. 22, tubular samples 204 were joined together. The outside diameter of each tube was 8 mm, and the inside diameter was 6 mm.

Figure 23:
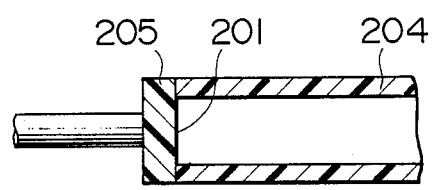

As shown in FIG. 23, a disklike sample 205 of 3 mm thick was joined to one of the tubular samples 204. The disklike sample 205 was held by a holder made of sapphire. The diameter of the holder was 3 mm.

Figure 24:
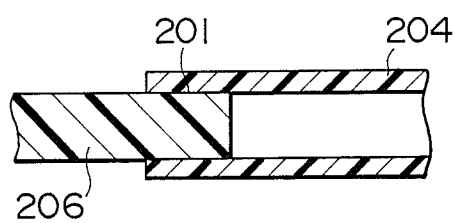

As shown in FIG. 24, a rodlike sample 206 having a diameter of 6 mm was inserted 5 mm into one of the tubular samples 204. Then, the inserted portion was joined to the tubular sample 204.

Figure 25:
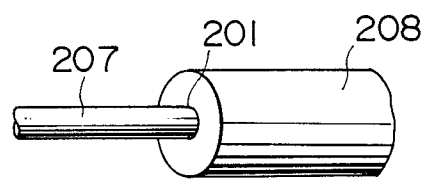
FIGS. 25 and 26 are perspective views of ceramics joined together by the sixth embodiment of the apparatus shown in FIG. 1.

As shown in FIG. 25, a sample 207 shaped into a round rod having a diameter of 3 mm was joined to another sample 208 shaped also into a round rod having a diameter of 6 mm.

Figure 26:
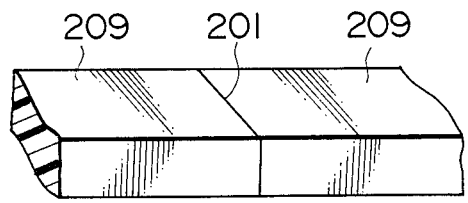

As shown in FIG. 26, rectangular samples 209 were joined together. The cross section of each sample 209 measured 4 mm by 6 mm.

Figure 27:
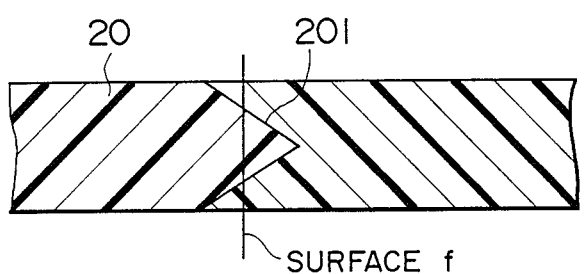
FIG. 27 is a cross-sectional view of ceramics joined together by the sixth embodiment of the apparatus shown in FIG. 1.

As shown in FIG. 27, ceramic samples 20 were joined together. The samples 20 were each shaped into a round rod having a diameter of 5 mm. One of the samples protruded and assumed a V-shaped form that made an angle of 90°. The other sample was recessed so as to conform with the shape of said one sample. An electric field was so produced that it was parallel to a plane f and that the field strength on the plane f was greatest.

Figure 28:
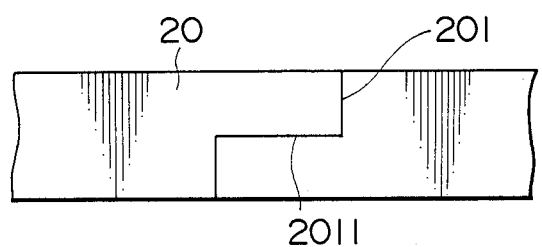
FIG. 28 is a side elevation of ceramics joined together by the sixth embodiment of the apparatus shown in FIG. 1.

As shown in FIG. 28, rectangular samples each having a step at its end were joined together. Each sample measured 5 mm by 5 mm. An electric field was developed so that it was parallel to a central joining surface 2011 and that the field intensity on a central joining surface 2011 was greatest. In any of these cases, the strength of the joined sample was the same as the strength of the base materials.

A rodlike sample of sintered alumina similar to the samples used in the embodiment described in connection with FIGS. 16 and 17 was joined to a sample of sintered alumina of the same size, using the apparatus shown in FIGS. 16 and 17. The purity of the former rodlike sample was 92%, while the purity of the latter sample was 99%. The dielectric loss factor of the latter sample was 0.001 at room temperature. A sample of alumina similar to the samples used in the embodiment already described in connection with FIGS. 16 and 17 was joined to a sample of sintered silicon nitride of the same size. The dielectric loss factor of the silicon nitride was 0.005 at room temperature. The conditions including the shape of the joining surfaces of the alumina samples, the pressure applied, the temperature at which the joining operation is performed, and the time for which the joining operation is performed were the same as the conditions employed in the embodiment described in conjunction with FIGS. 16 and 17. When the sample of sintered silicon nitride was joined to the alumina sample, the inside of the cavity resonator was filled with nitrogen gas in the same way as in the embodiment described in connection with FIG. 21. In every case, the obtained strength of joining exceeded 70% of the strength of the alumina base materials having a purity of 92%.

In the embodiments described in connection with FIGS. 16–20, round rods of alumina were joined together. In the embodiment described in connection with FIG. 21, round rods of silicon nitride were joined together. In the embodiments described in connection with FIGS. 22–26, members of different shapes were joined together. In the last-mentioned embodiments, members of different materials were joined together. Obviously, other ceramics such as zirconia, mullite, and silicon carbide can be joined together in the same manner.

What is claimed is:

1. An apparatus for joining ceramics, comprising:
   a cavity resonator in which ceramics to be joined are placed;
   a microwave-generating means for producing microwave radiation to be introduced into said cavity resonator;
   a pressurizing means for applying a pressure to the ceramics so as to press joining surfaces thereof against each other; and
   a temperature control means for controlling a temperature distribution of the ceramics so as to make a temperature of the ceramics highest at the joining surfaces of the ceramics and rapidly decreased toward unjoined ends of the ceramics;
   said temperature control means including means for providing a temperature at the joining surfaces elevated to the level at which the dielectric loss factors of said ceramics are substantially increased.

2. An apparatus for joining ceramics according to claim 1, wherein said temperature control means comprises a dielectric heating means for producing an electric field perpendicular to the axis of the ceramics and having an electric field intensity which is highest at the joining surfaces of the ceramics.

3. An apparatus for joining ceramics according to claim 1, wherein said temperature control means comprises a dielectric heating means for producing an electric field parallel to the joining surfaces of the ceramics and having an electric field intensity which is highest at the joining surfaces of the ceramics.

4. An apparatus for joining ceramics according to claim 1, wherein said temperature control means comprises: a dielectric heating means for applying microwave energy to the ceramics to heat the ceramics by dielectric heating; and a temperature difference-producing means for making the temperature of the joining surfaces of the ceramics higher than the temperature of the unjoined ends of the ceramics.

5. An apparatus for joining ceramics according to claim 4, wherein said temperature difference-producing means comprises a cooling means for cooling the unjoined ends of the ceramics.

6. An apparatus for joining ceramics according to claim 4, wherein said temperature difference-producing means comprises an intermediate which is interposed between the joining surfaces of the ceramics and made of a material having a dielectric loss factor larger than that of the ceramics.

7. An apparatus for joining ceramics according to claim 4, wherein said temperature difference-producing means comprises holding means for holding the ceramics in said cavity resonator, said holding means being made of a material having a dielectric loss factor smaller than that of the ceramics.

* * * * *